(12) United States Patent
Gennai et al.

(10) Patent No.: US 6,761,394 B2
(45) Date of Patent: Jul. 13, 2004

(54) VEHICLE FRONT BODY STRUCTURE

(75) Inventors: Kiyoshi Gennai, Atsugi (JP); Yasuhiro Tosaka, Hadano (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/405,649

(22) Filed: Apr. 3, 2003

(65) Prior Publication Data

US 2003/0193215 A1 Oct. 16, 2003

(30) Foreign Application Priority Data

Apr. 12, 2002 (JP) ..................................... P 2002-110650
Feb. 7, 2003 (JP) ..................................... P 2003-031355

(51) Int. Cl.[7] .............................................. B60K 37/00
(52) U.S. Cl. ........................... 296/203.01; 296/203.2; 296/203.03; 296/187.09; 296/187.12
(58) Field of Search ....................... 296/203.01, 203.02, 296/203.03, 187.12, 187.09, 193.05, 193.09

(56) References Cited

U.S. PATENT DOCUMENTS 4,804,222 A * 2/1989 Sakiyama et al. ..... 296/203.02
5,560,674 A * 10/1996 Tazaki et al. .......... 296/193.09
2003/0141712 A1 * 7/2003 Miyasaka ................... 280/784

FOREIGN PATENT DOCUMENTS

| JP | 402283580 A | * 11/1990 | ............ 296/203.01 |
| JP | 09-309461 | 12/1997 | |

* cited by examiner

Primary Examiner—Lori L. Coletta
(74) Attorney, Agent, or Firm—McDermott, Will & Emery

(57) ABSTRACT

A vehicle front body structure which includes a dash panel, a dash side panel joined to the dash panel and a side sill joined to the dash side panel. The dash panel is provided with a flange on its transversely outer side. The dash side panel includes an upstanding portion which has a substantially channel-shaped section open outward and includes a front wall on its front side, and a base portion which extends rearward from the upstanding portion. The side sill includes a sill inner joined to the base portion of the dash side panel. The flange of the dash panel extends along the front wall of the upstanding portion of the dash side panel to be joined to the front wall.

6 Claims, 5 Drawing Sheets

VEHICLE FRONT BODY STRUCTURE

BACKGROUND OF THE INVENTION

1. Field of the Invention

The present invention relates to a vehicle front body structure, particularly to a structure of a dash panel and a dash side panel, and a structure around a joined portion therebetween.

2. Description of Related Art

Japanese Patent Application Laid-Open No. 9(1997)-309461 discloses a front pillar joined to an outer side in a vehicle transverse direction of a dash panel which partitions an engine compartment and a cabin compartment. The front pillar has a closed cross-section composed of an inner panel and an outer panel joined thereto.

SUMMARY OF THE INVENTION

The above front pillar has, on its front side, a frontwardly extending portion joined to the transversely outer side of the dash panel, which constitutes a dash side panel in a channel-shape extending vertically between the dash panel and the inner panel of the front pillar.

Due to the channel-shaped dash side panel extending between the dash panel and the front pillar, the rigidity of a vehicle body is lowered. Therefore, the vehicle body cannot generate, at a frontal collision, a sufficient reaction force against an impact load in a vehicle longitudinal direction, and vibrations cannot be effectively transmitted through the entire vehicle body during running.

In consideration of the problems as described above, an object of the present invention is to provide a vehicle front body structure, including a dash panel and a dash side panel joined together, with an enhanced rigidity, which enables a vehicle body to generate, at a frontal collision, a sufficient reaction force against an impact load in a vehicle longitudinal direction and allows vibrations to be transmitted through the entire vehicle body during running, thus effectively dispersing and absorbing the energy of the impact load and vibrations into the vehicle body.

An aspect of the present invention is a vehicle front body structure comprising: a dash panel having a flange on its transversely outer side; a dash side panel joined to the dash panel, the dash side panel comprising an upstanding portion having a substantially channel-shaped section open outward and a base portion extending rearward from the upstanding portion, the upstanding portion including a front wall on its front side; and a side sill joined to the dash side panel, including a sill inner joined to the base portion of the dash side panel, wherein the flange of the dash panel extends along the front wall of the upstanding portion of the dash side panel to be joined to the front wall.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
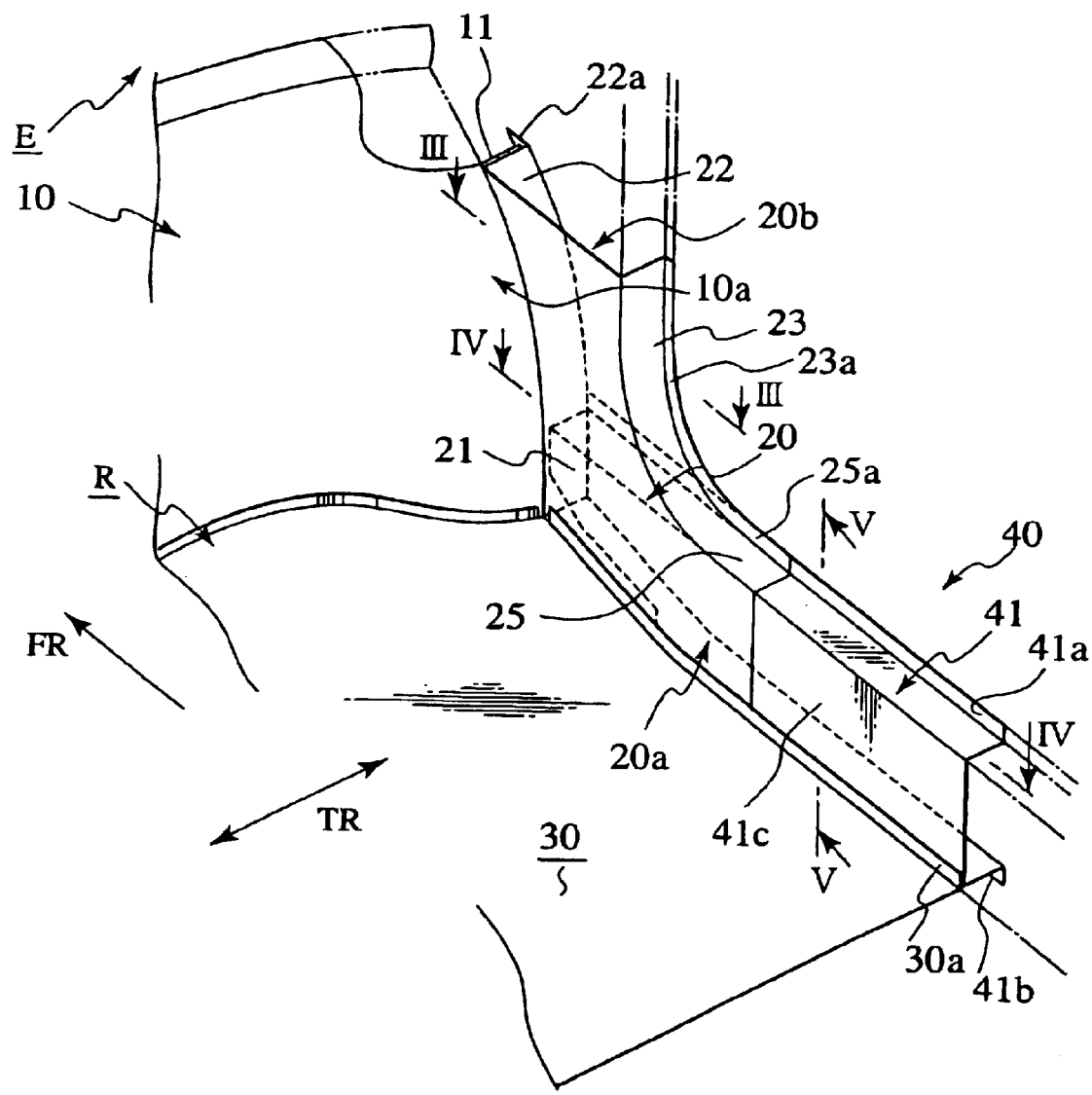
FIG. 1 is a perspective view of a vehicle front body structure according to an embodiment of the present invention, showing a floor panel, a dash panel, a dash side panel, and a sill inner viewed from inside a cabin compartment.

An Embodiment of the present invention will be explained below with reference to the drawings, wherein like members are designated by like reference characters.

As illustrated in FIG. 1, a dash panel 10, extending in a vehicle transverse direction, partitions a cabin compartment R and an engine compartment E. A dash side panel 20 is joined to both transversely outer portions 10a of the dash panel 10.

Figure 2:
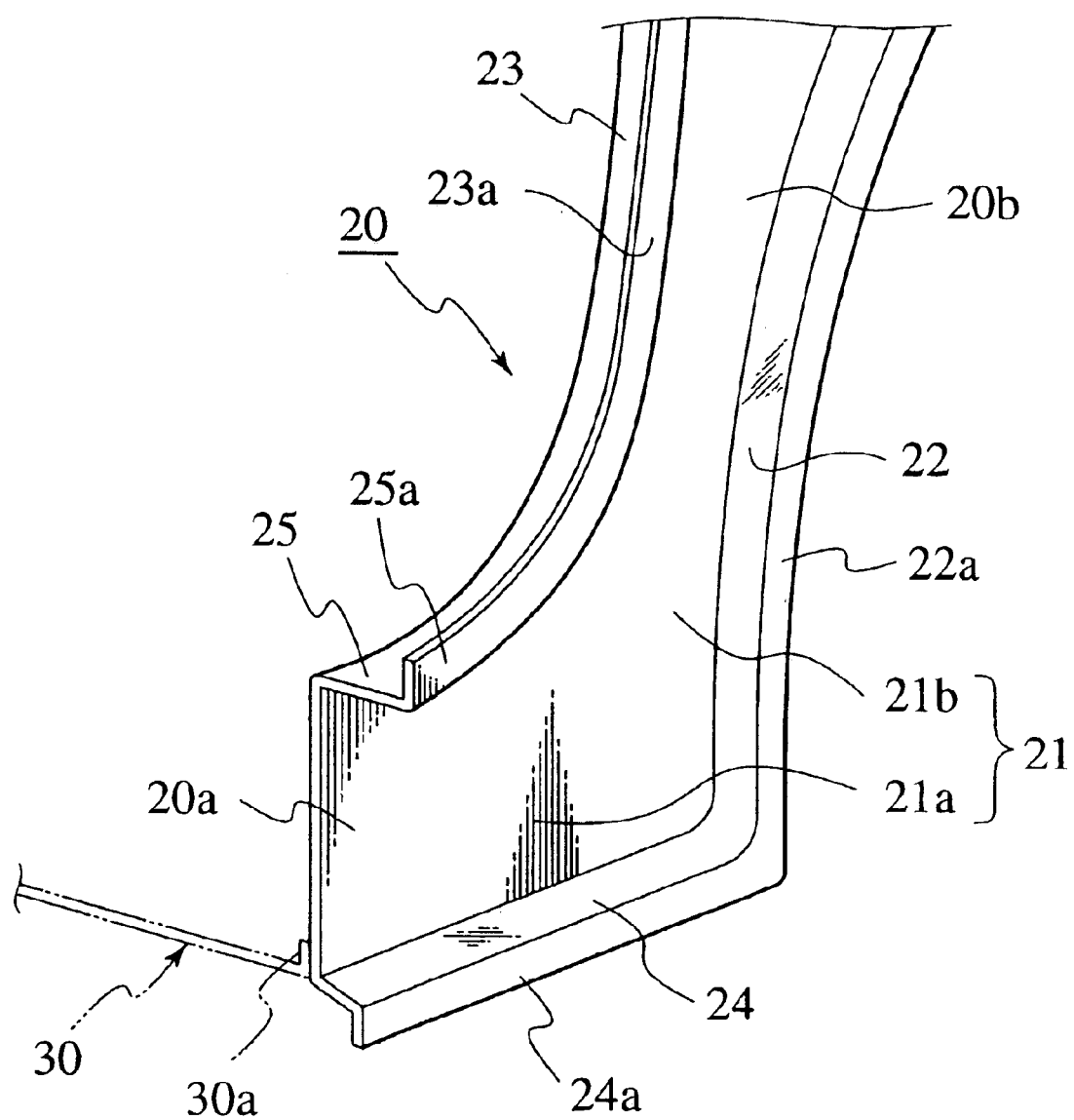
FIG. 2 is a perspective view of the dash side panel of FIG. 1 viewed from outside the cabin compartment.

As illustrated in FIG. 2, the dash side panel 20 is formed substantially into an L-shape as a whole, which includes an upstanding portion 20b extending mainly in a vertical direction, and a base portion 20a extending rearward from a lower part of the upstanding portion 20b. The base portion 20a is joined to a front portion of a side sill 40 which extends in the vehicle longitudinal direction along one of the transversely outer sides of a floor panel 30 and constitutes a frame structure of the cabin compartment.

Figure 5:
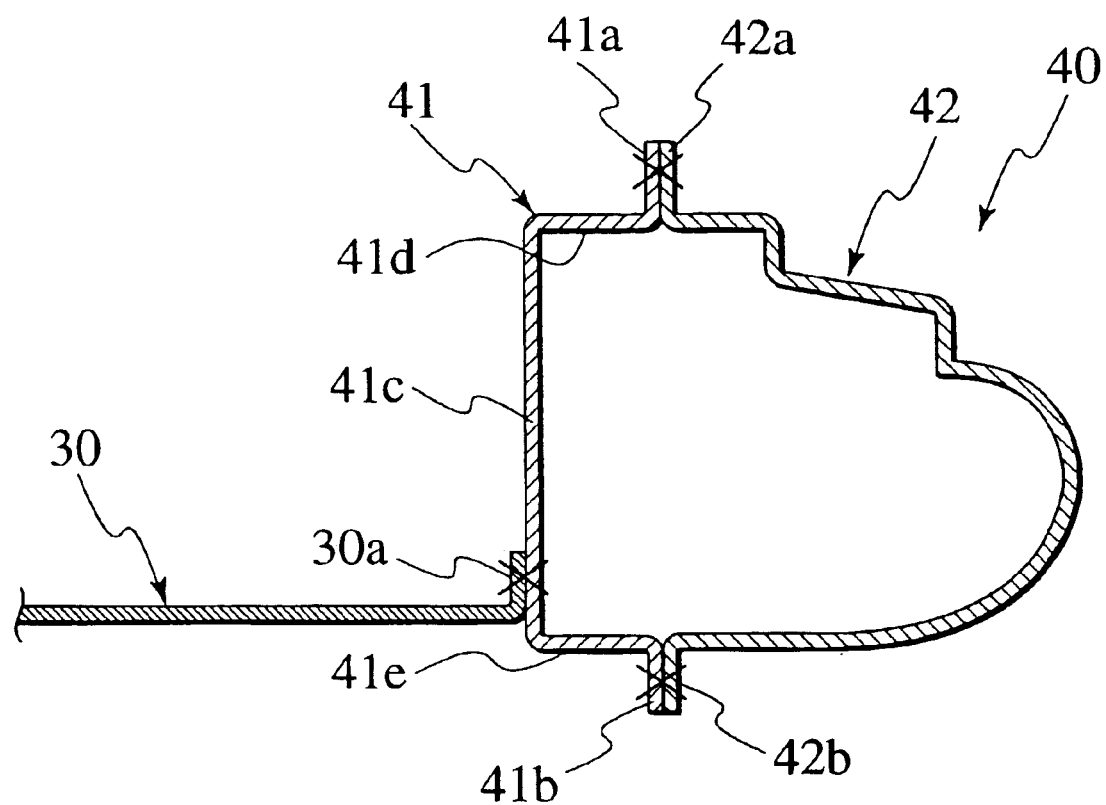
FIG. 5 is a sectional view of the vehicle front body structure of FIG. 1, taken along line V—V in FIG. 1.

As illustrated in FIG. 5, the side sill 40 has a closed cross-section constituted of a sill inner 41 and a sill outer 42 joined thereto. An upper flange 41a and a lower flange 41b of the sill inner 41, which will be described hereinafter, are joined to an upper flange 42a and a lower flange 42b of the sill outer 42, respectively.

The sill inner 41 is formed to have a substantially hat-shaped (or channel-shaped) cross-section open toward the outside of the cabin compartment, which is constituted of an transversely inner vertical wall 41c orthogonal to the floor panel 30, an upper wall 41d extending transversely outward from an upper end of the vertical wall 41c, a lower wall 41e extending transversely outward from a lower end of the vertical wall 41c, and an upper flange 41a and a lower flange 41b extending upward and downward from the transversely outer edges of the upper wall 41d and the lower wall 41e, respectively. To a transversely inner side surface of the vertical wall 41c, a flange 30a formed by bending a transversely outer edge of the floor panel 30 is joined by spot welding.

Figure 3:
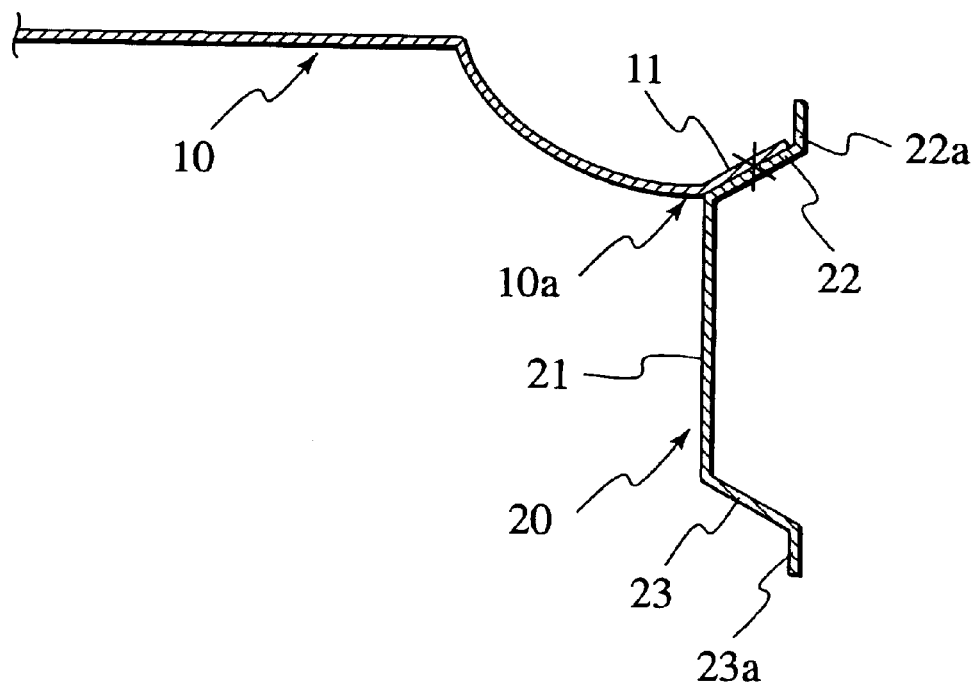
FIG. 3 is a sectional view of the vehicle front body structure of FIG. 1, taken along line III—III in FIG. 1.
Figure 4:
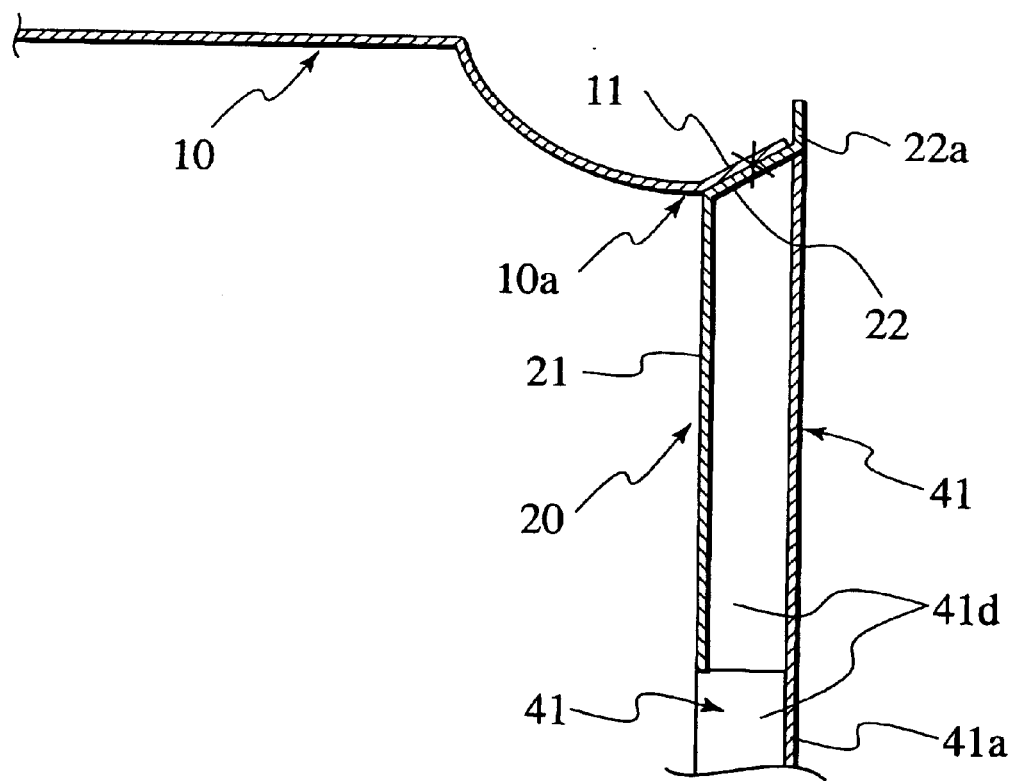
FIG. 4 is a sectional view of the vehicle front body structure of FIG. 1, taken along line IV—IV in FIG. 1.

As illustrated in FIGS. 2 and 3, the upstanding portion 20b of the dash side panel 20 is formed to have a substantially hat-shaped (or channel-shaped) cross-section open toward the outside of the cabin compartment, which is constituted of a transversely inner vertical wall 21b, a front wall 22 extending transversely outward and frontward slantwise from a front end of the vertical wall 21b, a rear wall 23 extending transversely outward and rearward slantwise from a rear end of the vertical wall 21b, and a front flange 22a and a rear flange 23a extending forward and rearward from the transversely outer edges of the front wall 22 and the rear wall 23, respectively.

The base portion 20a of the dash side panel 20 is formed to have a substantially hat-shaped (or channel-shaped) cross-section open toward the outside of the cabin compartment, which is constituted of a transversely inner vertical wall 21a, an upper wall 25 extending transversely outward from an upper end of the vertical wall 21a, a lower wall 24 extending transversely outward from a lower end of the vertical wall 21a, and an upper flange 25a and a lower flange 24a extending upward and downward from the transversely outer edges of the upper wall 25 and the lower wall 24, respectively.

The vertical wall 21b of the upstanding portion 20b and the vertical wall 21a of the base portion 20a constitute a continuous vertical wall 21 of the dash side panel 20. The front wall 22 of the upstanding portion 20b and the lower wall 24 of the base portion 20a are formed to be smoothly continuous with each other at a front lower end of the dash side panel 20. The rear wall 23 of the upstanding portion 20b and the upper wall 25 of the base portion are formed to be continuous with each other, forming a smooth curved surface. Moreover, the front and rear flanges 22a and 23a of the upstanding portion 20b are formed to be continuous with the lower and upper flanges 24a and 25a of the base portion 20a, respectively.

On the transversely outer side of the dash side panel 20, an outer pillar panel (not shown) is joined to the flanges 22a, 23a, 24a and 25a of the dash side panel 20, forming a closed cross-section to constitute an outer pillar.

As illustrated in FIG. 3, at the transversely outer portion 10a of the dash panel 10, a flange 11 is formed to extend transversely outward and frontward slantwise along the front wall 22 of the dash side panel 20 from a transversely inner end of the front wall 22 to a transversely outer end thereof, so that a rear surface of the flange 11 is mated with a front surface of the front wall 22. The flange 11 is joined to the front wall 22 by spot welding at predetermined positions.

The base portion 20a of the dash side panel 20 is formed to have a cross-section identical to that of the sill inner 41 of the side sill 40. The vertical wall 21a of the base portion 20a is joined to the vertical wall 41c of the sill inner 41, forming a continuous surface. Moreover, the upper wall 25, lower wall 24, upper flange 25a and lower flange 24a of the base portion 20a form smooth and continuous surfaces, cooperating with the upper wall 41d, lower wall 41e, upper flange 41a and lower flange 41b of the sill inner 41, respectively.

A front portion of the sill inner 41, including the vertical wall 41c, upper wall 41d and upper flange 41a thereof, is extended frontward inside the base portion 20a of the dash side panel 20, and is joined to the inner surface of the front wall 22 of the upstanding portion 20b. The sill inner 41 is thus joined to the dash panel 10 with the front wall 22 of the dash side panel 20 and the flange 11 joined thereto interposed therebetween.

In the above-described structure, since the dash panel 10 and the dash side panel 20 are joined with the flange 11 of the transversely outer portion 10a of the dash panel 10 and the front wall 22 of the dash side panel 20 mated with each other, the rigidity of the vehicle front body is enhanced. Thus, the vehicle body is enabled to generate, at a frontal collision, a sufficient reaction force against the impact load in the vehicle longitudinal direction and vibrations are allowed to be transmitted through the entire vehicle body, through the dash panel 10 and the dash side panel 20, during running. Eventually, the energy of such an impact load and vibrations can be effectively dispersed and absorbed into the vehicle body including the cabin compartment.

Moreover, since both the front wall 22 and the flange 11 are formed to extend transversely outward and frontward slantwise, the dash side panel 20 can be easily adjusted for accurate positioning during assembly, to the transversely outer side of the dash panel 10. Moreover, the above configuration provides an open space, making it easy for a spot welding gun to access the front wall 21 of the dash side panel 2 with a certain distance from the welding gun to the front wall 21 maintained, leading to an improvement in welding workability.

Furthermore, since the sill inner 41 is extended inside the base portion 20a of the dash side panel 20 and joined to the front wall 22 of the upstanding portion 20b thereof, the sill inner can bear the impact load at a frontal collision transmitted through the dash panel 10, suppressing displacement of the dash panel 10 toward the inside of the cabin compartment. Moreover, the upper wall 41d of the sill inner 41 extended to the front wall 22, serves as a sound insulation wall which blocks sound vibration being transmitted through the side sill 41 into the cabin compartment thereabove.

Figure 6A:
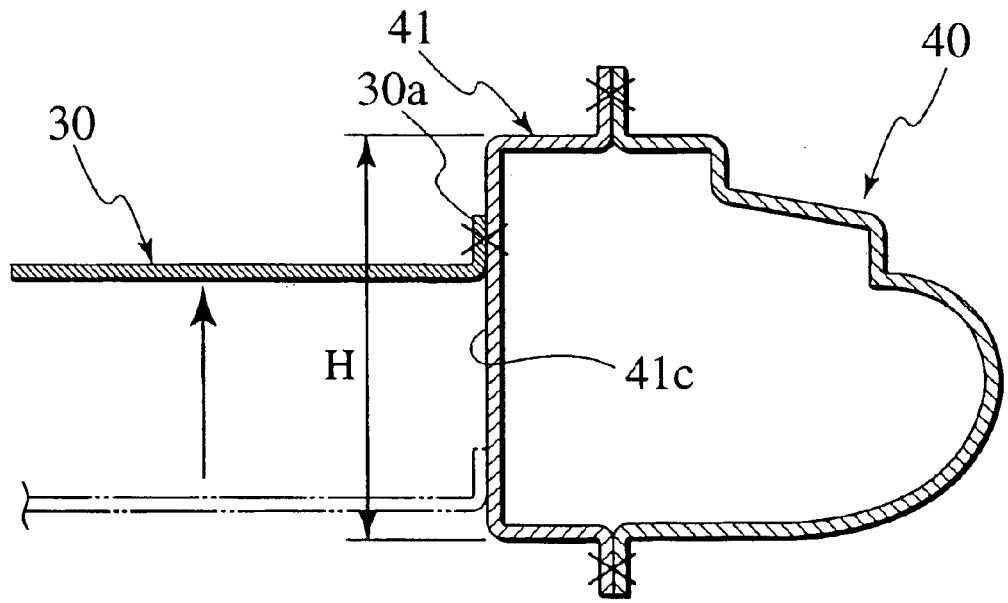
FIG. 6A shows variations in level of a floor panel attached to the sill inner and the dash side panel.
Figure 6B:
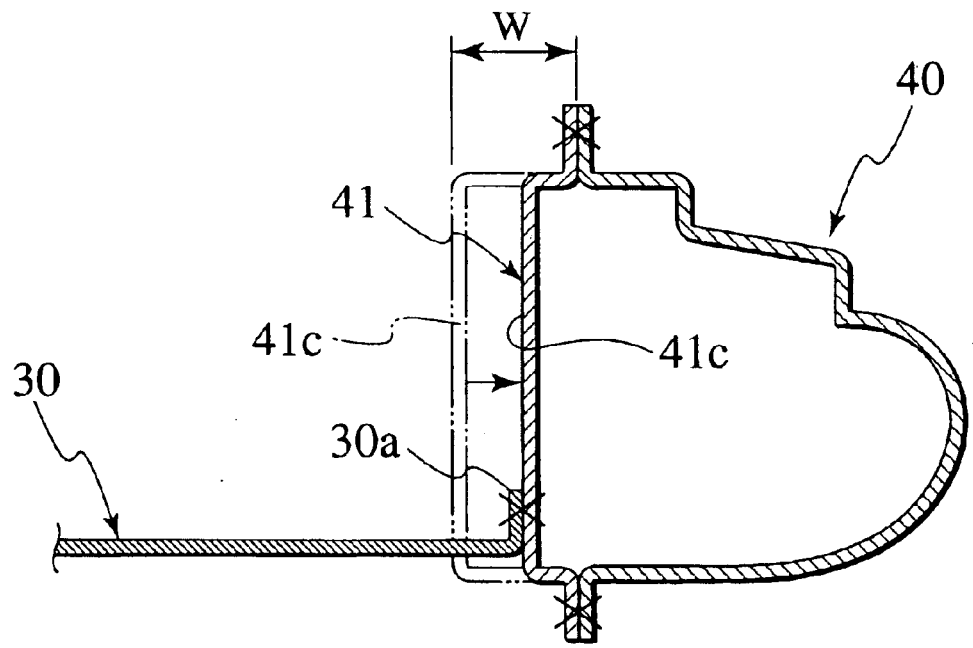
FIG. 6B shows variations in width of the sill inner and the dash side panel, with a floor panel attached thereto.

Moreover, since the vertical wall 21a of the base portion 20a of the dash side panel 20 and the vertical wall 41c of the sill inner 41 are joined so as to form a smooth and continuous surface on their transversely inner sides, elevation of the floor panel 30, joined to the transversely inner surfaces of the vertical walls 21a and 41c, relative to the side sill 40 can be adjusted, as illustrated in FIG. 6A, within the range of the height H of the vertical wall 41c, thus allowing the floor panel 30 to be common among various types of vehicles with various floor elevations. Moreover, as illustrated in FIG. 6B, the floor panel 30 can be common among various types of vehicles with various widths, by adjusting the width W of the upper and lower walls 25 and 24 of the base portion 20a of the dash side panel 20 and of the upper and lower walls 41d and 41e of the sill inner 41.

The preferred embodiment described herein is illustrative and not restrictive, and the invention may be practiced or embodied in other ways without departing from the sprit or essential character thereof. The scope of the invention being indicated by the claims, and all variations which come within the meaning of claims are intended to be embraced herein.

The present disclosure relates to subject matters contained in Japanese Patent Application No. 2002-110650, filed on Apr. 12, 2002, and Japanese Patent Application No. 2003-031355, filed on Feb. 7, 2003, the disclosures of which are expressly incorporated herein by reference in its entirety.

What is claimed is:

1. A vehicle front body structure comprising:
    a dash panel having a flange on its transversely outer side;
    a dash side panel joined to the dash panel, the dash side panel comprising an upstanding portion having a substantially channel-shaped section open outward and a base portion extending rearward from the upstanding portion, the upstanding portion including a front wall on its front side; and
    a side sill joined to the dash side panel, including a sill inner joined to the base portion of the dash side panel, wherein
        the flange of the dash panel extends along the front wall of the upstanding portion of the dash side panel to be joined to the front wall.

2. A vehicle front body structure according to claim 1, wherein the flange of the dash panel extends transversely outward and frontward slantwise along the front wall.

3. A vehicle front body structure according to claim 1, wherein the base portion of the dash side panel has a section identical to that of the sill inner of the side sill.

4. A vehicle front body structure according to claim 1, wherein the base portion of the dash side panel and the sill inner of the side sill are configured to form a continuous surface on their transversely inner sides.

5. A vehicle front body structure according to claim 1, wherein the sill inner is extended to the front wall of the dash side panel.

6. A vehicle front body structure according to claim 5, wherein the sill inner includes an upper wall which is configured to be a sound insulation wall extended to the front wall of the dash side panel.

* * * * *